United States Patent [19]
Winarski

[11] Patent Number: 6,115,339
[45] Date of Patent: Sep. 5, 2000

[54] METHOD AND SYSTEM IN AN OPTICAL STORAGE DISC DRIVE FOR CONSERVING LASER POWER

[75] Inventor: Daniel James Winarski, Tucson, Ariz.

[73] Assignee: International Business Machines Corporation, Armonk, N.Y.

[21] Appl. No.: 09/099,220

[22] Filed: Jun. 17, 1998

[51] Int. Cl.$^7$ ........................................................ G11B 3/90
[52] U.S. Cl. ............................................... 369/54; 369/116
[58] Field of Search ..................................... 369/43, 44.26, 369/44.27, 44.29, 44.35, 54, 58, 94, 116

[56] References Cited

U.S. PATENT DOCUMENTS

| | | | |
|---|---|---|---|
| 5,381,401 | 1/1995 | Best et al. | 369/275.1 |
| 5,499,231 | 3/1996 | Fennema et al. | 369/124 |
| 5,555,537 | 9/1996 | Imaino et al. | 369/109 |
| 5,586,107 | 12/1996 | Best et al. | 369/275.1 |
| 5,610,901 | 3/1997 | Best et al. | 369/275.1 |
| 5,615,186 | 3/1997 | Rosen et al. | 369/44.24 |
| 5,625,609 | 4/1997 | Latta et al. | 369/44.23 |

Primary Examiner—Paul W. Huber
Attorney, Agent, or Firm—Douglas R. Millett; Felsman, Bradley, Vaden, Gunter & Dillon, LLP

[57] ABSTRACT

A method and system in an optical storage disc drive for conserving laser power after the reading or writing of data from or to an optical storage disc via a laser light beam generated by a laser light source within the optical storage disc drive, wherein the optical storage disc contains multiple data layers therein. An optical storage disc is provided wherein the optical storage disc includes an outermost data layer and successive multiple interior data layers therein for the storage of data. Thereafter, the laser light beam is focused at an interior data layer of the optical storage disc in order to read or write data from or to the interior data layer. Data is then read from or written to the interior data layer, in response to focusing the laser light beam at the interior data layer. Then, the laser light beam is automatically refocused at the outermost data layer of the optical storage disc if the optical storage disc drive enters a quiescent mode after the reading or writing of the data, such that upon refocusing, the laser light source experiences a decrease in laser power, thus promoting an extension of the life of the laser light source. The laser light beam can then be refocused at the next succeeding data layer of the optical storage disc, in response to terminating the quiescent mode, or in response to a particular user input.

14 Claims, 3 Drawing Sheets

METHOD AND SYSTEM IN AN OPTICAL STORAGE DISC DRIVE FOR CONSERVING LASER POWER

BACKGROUND OF THE INVENTION

1. Technical Field

The present invention relates to an improved information-retrieval method and system. In particular, the present invention relates to an improved digitally-based information-retrieval method and system. More particularly, the present invention relates to digital video discs and digital video disc drives. Still more particularly, the present invention relates to a method and system for conserving laser power after the retrieval of digital video data from digital video discs and to a method and system for extending the operating life of digital video disc drives.

2. Description of the Related Art

The digital video disc (DVD) is the next generation of optical disc storage technology, which succeeds where compact disc (CD) technology, including CD-ROM technology, ended. Within digital video disc technology, audio, computer, and video data can be encoded onto a digital video disc, which appears visually to resemble a CD or CD-ROM, but which stores a much greater amount of data. A typical digital video disc stores greater amounts of data than traditional CDs. A standard, single-layer, single-side digital video disc, for example, can store 4.7 GB of data, while a two-layer standard digital video disc increases the single-sided disc capacity to 8.5 GB. Digital video discs may be composed of double-sided discs having a storage capacity of approximately 17 GB per disc. Or course, as technology advances, this storage capacity will increase. (Note that the acronym "DVD" can equally represent the term "Digital Versatile Disc" as well as the term "Digital Video Disc".)

A problem associated with digital video disc drives which retrieve video data and other associated data (i.e., audio data, computer data, etc.) from digital video discs involves the power required by a laser light source to successively read multiple interior data layers of typical digital video discs. Some digital video disc drives may require an increase in the laser power required to successively reading these multiple interior layers. This increase in laser power is necessary to increase the signal-to-noise ratio inherent with reading data from optical storage discs and to compensate for the absence of an aberration compensator in the optical path.

Any increase in laser power leads to a shortening in the life of the laser, because the laser's life is inversely proportional the power levels at which it operates. When the laser power is increased geometrically according to the number interior layers being read, the laser life is unduly shortened because the laser remains constantly in a power-on tracking mode for a given interior layer, even after all the video data and other associated data has been read from that particular interior layer. Even during quiescent or transition periods prior to focusing the laser on a subsequent layer, and hence a subsequent track of the digital video disc in use, the digital video disc drive laser continues to operate at that power level.

Based on the foregoing, it can be appreciated that a need exists for a method and system which would effectively decrease the power level at which a laser light source operates after a reading of video data and other associated data contained within multiple layers of an optical storage disc, such as a digital video disc. Such a method and system, if implemented, would result in an increase in the life of laser light sources utilized in association with optical storage device drives, such as DVD drives.

SUMMARY OF THE INVENTION

It is therefore an object of the invention to provide an improved information-retrieval method and system.

It is another object of the invention to provide an improved digital-based information-retrieval method and system.

It is still another object of the invention to provide an improved digital video disc drive that retrieves video data from digital video discs.

It is yet another object of the invention to provide an improved method and system for conserving laser power after the retrieval of digital video data from digital video discs.

It is another object of the present invention to provide a method and system for extending the operating life of digital video disc drives.

The above and other objects are achieved as is now described. A method and system in an optical storage disc drive for conserving laser power after the reading or writing of data from or to an optical storage disc via a laser light beam generated by a laser light source within the optical storage disc drive, wherein the optical storage disc contains multiple data layers therein. An optical storage disc is provided wherein the optical storage disc includes an outermost data layer and successive multiple interior data layers therein for the storage of data. Thereafter, the laser light beam is focused at an interior data layer of the optical storage disc in order to read or write data from or to the interior data layer. Data is then read from or written to the interior data layer, in response to focusing the laser light beam at the interior data layer.

The laser light beam is then automatically refocused at the outermost data layer of the optical storage disc if the optical storage disc drive enters a quiescent mode after the reading or writing of the data, such that upon refocusing, the laser light source experiences a decrease in laser power, thus promoting an extension of the life of the laser light source. The laser light beam can then be refocused at the next succeeding data layer of the optical storage disc, in response to terminating the quiescent mode, or in response to a particular user input. The optical storage disc drive and the optical storage disc can be respectively configured as a digital video disc (DVD) drive and a digital video disc.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
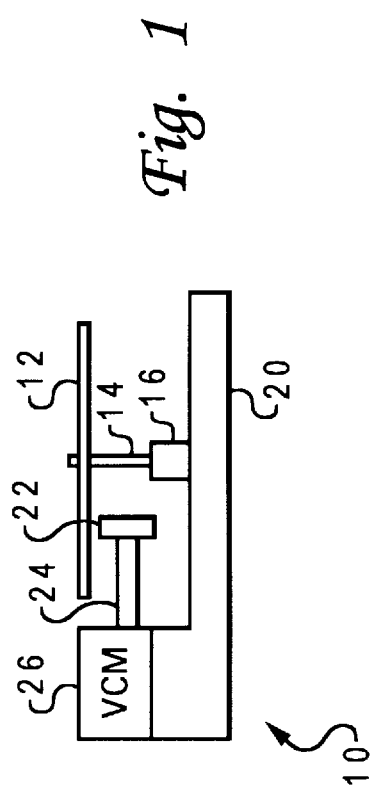
FIG. 1 is a schematic diagram of a digital video disc storage system which can be utilized in accordance with a preferred embodiment of the present invention.

With reference now to the figures and in particular with reference to FIG. 1, there is depicted a schematic diagram of a digital video disc storage system 10 in accordance with a preferred embodiment of the present invention. Digital video disc storage system 10 includes a digital video disc 12 which is removably mounted on a spindle 14 as is known in the art. Spindle 14 is attached to a spindle motor 16, which in turn is attached to a digital video disc system chassis 20. Motor 16 rotates spindle 14 and digital video disc 12. An optical head 22 is positioned below digital video disc 12. Head 22 is attached to an arm 24, which in turn is connected to an actuator device, such as a voice coil motor 26. Voice coil motor 26 is attached to chassis 20 and moves arm 24 and head 22 in a radial direction below digital video disc 12.

Video, audio, and computer data can be encoded onto a single digital video disc 12, and stores greater amounts of data than traditional compact discs. A standard single-layer, single-sided digital video disc can store 4.7 GB of data. A two-layer standard digital video disc increases the single-sided disc capacity to 8.5 GB. Digital video disc 12 also includes multiple successive interior layers wherein data may be stored and subsequently read by a digital video disc drive. Those skilled in the art will appreciate that although digital video disc drives and digital video disc systems are discussed in accordance with a preferred embodiment of the present invention, other types of optical disc drives may also be implemented in accordance with a preferred embodiment of the present invention.

Figure 2:
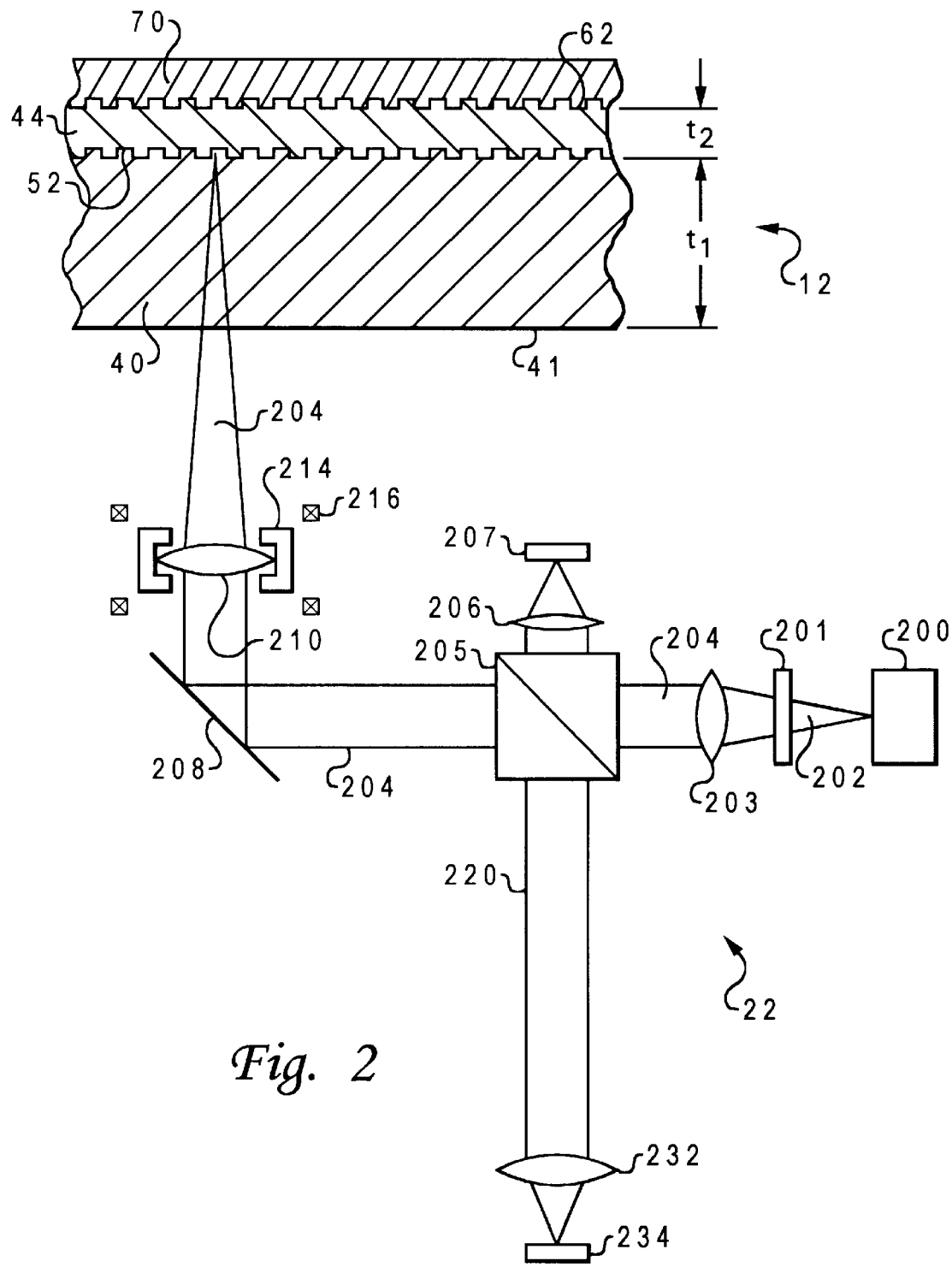
FIG. 2 illustrates a more detailed schematic diagram illustrative of the optical head and digital video disc of FIG. 1, in accordance with a preferred embodiment of the present invention.

FIG. 2 illustrates a more detailed schematic diagram illustrative of the optical head 22 and digital video disc 12 of FIG. 1, in accordance with a preferred embodiment of the present invention. Optical head 22 includes a laser diode 200, which may, for example, be a gallium-aluminum-arsenide dioxide laser that produces a primary beam of light 202. Primary beam of light 202 is first diffracted by grating 201 to produce two secondary beams for tracking, in addition to the primary data beam, and then collimated by lens 203. The resulting three-component beam 204 then passes to a beam splitter 205. A portion of beam 204 is reflected by beam splitter 205 to a lens 206 and an optical detector 207. Detector 207 monitors the power of laser beam 204, which is reflected by mirror 208, passes through a focus lens 210 and is focused to a diffraction-limited spot.

Focus lens 210 is mounted in a holder 214, the position of which is adjusted relative to digital video disc 12 by a focus actuator motor 216, which may be implemented as a voice coil motor, well known in the art of digital storage devices. Movement of focus lens 210 by the focus actuator moves the focused spot between data layers 52, 62 of digital video disc 12. Those skilled in the art will appreciate that although digital video disc 12 depicted in FIG. 2 illustrates a digital video disc 12 having only two data layers, digital video disc 12 may be implemented as an optical storage device having many additional interior data layers. Thus, a portion of light beam 204 is reflected off of either data layer 52 or 62 as a reflected beam 220. Beam 220 returns through lens 210 and is reflected by mirror 208. At beam splitter 205, beam 220 is directed through an astigmatic lens 232 and onto a multi-element optical detector 234.

Figure 3:
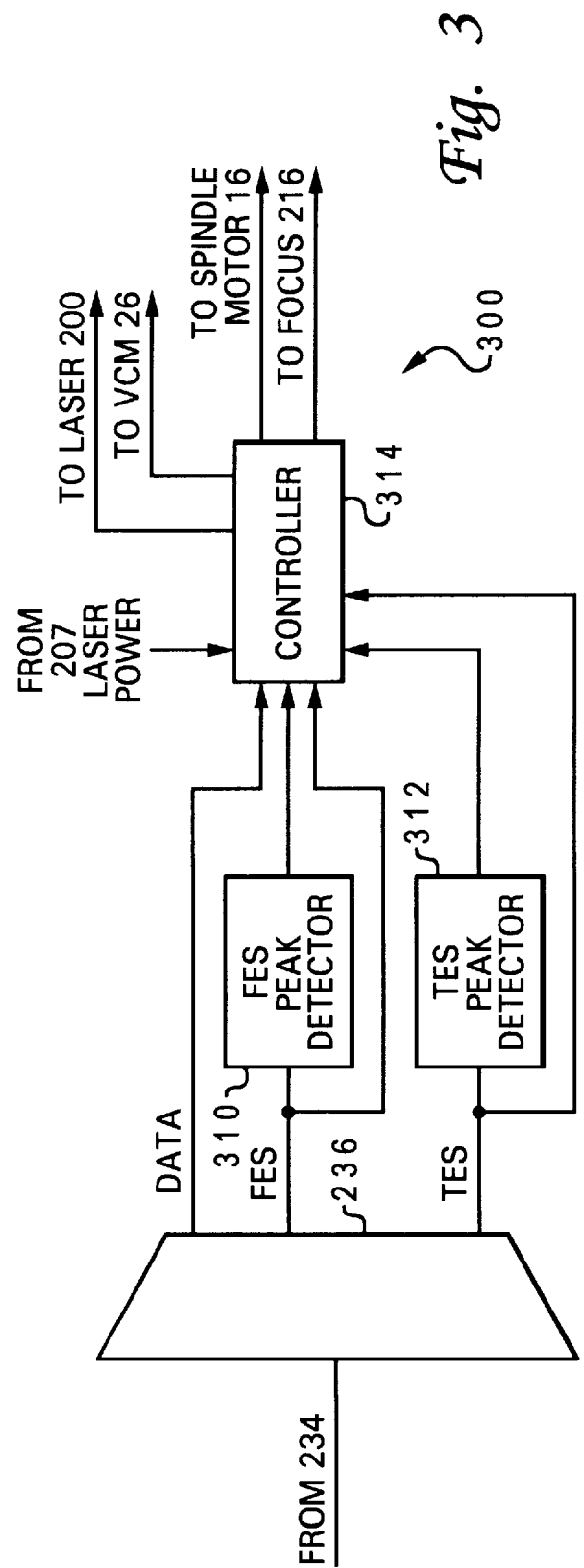
FIG. 3 is a block diagram of a controller system of the digital video disc drive system of FIG. 1 and FIG. 2 in accordance with a preferred embodiment of the present invention.

FIG. 3 is a block diagram of a controller system 300 within the digital video disc drive system of FIG. 1 and FIG. 2, in accordance with a preferred embodiment of the present invention. Multi-element detector 234 of FIG. 2 generates output signals that provide a data signal, a focus error signal (FES) and a tracking error signal (TES). These signals are amplified by signal amplifier 236 and sent directly to controller 314. A peak detector 310 also receives the FES, and a peak detector 312 also receives the TES from signal amplifier 236. Controller 314 also receives input signals from laser power optical detector 207 as well as the outputs of peak detectors 310 and 312. Controller 314 is a microprocessor-based disk drive controller, and is connected to and controls laser diode 200, which is one form of a laser light source for generating a laser light beam. Controller 314 is also connected to and controls head motor 26, spindle motor 16 and focus actuator motor 216. Focus actuator motor 216 can be implemented via a voice coil motor or other devices such as a piezoelectric mount for the focus lens or a fixed position liquid crystal lens. An applied voltage alters the refractive index of the liquid crystal material comprising the liquid crystal lens, thus altering the focal length and changing the focus without moving the lens.

Referring again to FIG. 2, digital video disc 12 is shown in cross-section. Digital video disc 12 comprises a light-transmissive substrate 40, typically polycarbonate. A first surface 41 of substrate 40 faces focus lens 210 and is the side onto which the light is incident. The opposite surface of substrate 40 has formed on it a first data layer 52. First data layer 52 is a pattern of pits or depressions formed into the surface of substrate 40 and covered with a film of partially light-transmissive material. First data layer 52 is formed by conventional injection, molding, embossing, or photopolymer replication. Substrate 40 and first data layer 52 are similar to those found in conventional CDs, with the exception that the film covering the pattern of pits on the substrate surface is partially light-transmissive rather than totally reflective. This film of material can be formed of any conventional semiconductor material (e.g., amorphous Si, SiC, GaSb), dielectric material (e.g., $ZrO_2$, SiN), or metallic material (e.g., Al, Au). These materials can be deposited by sputtering or evaporation, as is known in the art, and may have a thickness in the range of 30–3000 Angstroms.

A light-transmissive spacer layer 44 is formed over first data layer 52. Light-transmissive space layer 44 can be formed of a photopolymer material deposited by spin-coating. Alternatively, light-transmissive space layer 44 can be formed via a lamination process (e.g., gluing a thin plastic sheet, embossed with data layer 62, onto the covering film of first data layer 52 on substrate 40). The surface of light-transmissive space layer 44 opposite the surface in contact with first data layer 52 has formed in it a second data layer 62. Second data layer 62 may comprise the last data layer in the digital video disc 12, and may have a typical thickness in the range of 100–1000 Angstroms. Again, those skilled in the art will appreciate that although only two data layers are depicted, other interior data layers may be implemented in accordance with a preferred embodiment of the present invention.

The embossed pattern of second data layer 62 may be formed by a photopolymerization process with a stamper in contact with the polymer, wherein the polymer is cured by ultraviolet radiation. If light-transmissive spacer layer 44 is formed by lamination, the second data layer 62 may be pre-embossed onto the plastic sheet before the sheet is glued to substrate 40. Typically, the depth of the pits in the embossed patters in data layers 52 and 62 lies in the range of 1000 to 2000 Angstroms, but may vary. Finally, a protective layer 70 is of a photopolymer is formed over second data layer 62 by spin-coating followed by curing. The multi-layer digital video disc 12 shown in FIG. 2 is a dual data layer disc.

The substrate 40 has a thickness t1 and is formed of light-transmissive material with an index of refraction n1. Light-transmissive spacer layer 44 has a thickness t2 and is formed of light transmissive material with an index of refraction n2. Additional data layers may of course by utilized in association with digital video disc 12. For example, additional embossed patterns and partially light-transmissive films may be formed between first data layer 52 and second data layer 62.

The operation of digital video disc storage system 10 of FIG. 1 may now be understood with reference to FIG. 2 and FIG. 3. Controller 314 controls motor 16 that rotates digital video disc 12 and motor 26 that moves optical head 22 to the proper-position below digital video disc 12. Laser 200 is energized to read data from digital video disc 12. The beam 204 is focused by focus lens 210 to a nearly diffraction-limited spot and this focused spot is located on the desired one of the data layers 52 and 62. The reflected beam 220 returns and is directed to multi-element detector 234 by astigmatic lens 232.

The FES, TES and data signals are output by detector 234 and amplified by amplifier 236 of FIG. 3. The FES is utilized by controller 314 in a conventional servo-control technique to control focus actuator motor 216 so that focus lens 210 maintains the spot on the desired data layer (e.g., data layer 52) as digital video disc 12 rotates. When it is desired to read data from data layer 62, the controller 314 signals focus actuator motor 216 to move the lens so the spot is moved from data layer 52 to data layer 62. When the spot is located on data layer 62, the light from focus lens 210 traverses the entire thickness t1 of substrate 40 and thickness t2 of light-transmissive space layer 44.

It is often necessary when utilizing digital video disc drives in accordance with digital video disc drive systems such as the optical disc drive system of FIG. 1 to FIG. 3 to increase laser power when successively reading interior layers of an optical storage disc such as digital video disc 12. This increase in laser power is necessary to increase the signal-to-noise ratio and which is probably necessary to make up for the absence of an aberration compensator in the optical path. Such an increase in laser power can very well shorten the life of the laser, because the laser's life is inversely proportional to the power levels at which it operates.

In accordance with a preferred embodiment of the present invention, when a digital video disc drive is operating a quiescent state in accordance with an optical storage disc drive system, such as digital video disc storage system 10 of FIG. 1 to FIG. 3, controller 314 signals focus actuator motor 216 to move the lens so that the aforementioned spot is moved from an interior data layer to the outermost data layer of the digital video disc in order to conserve laser life. When the laser power is increased geometrically according to the number of interior data layers being read, laser life is unduly shortened by leaving the laser in a power-on tracking mode at that particular interior layer.

By "jumping" to the outermost layer, the life of the laser is dramatically increased by running the laser at the lowest power possible during a tracking period, while the digital video disc drive runs in a quiescent or "quiet" state. If there is only a 5% loss of light per layer, for example, the laser would require a power increase of $1.05^9$ which is equivalent to 1.55 or 155% of the original power required to read the 10th layer. Thus, jumping from layer 10 to layer 1 would result in a significant reduction in laser power, which translates to added laser life.

"Jumping" to the outermost layer of a multi-layer digital video disc in order to conserve laser life may be accomplished when there is no aberration compensator in the optical path and the laser must increase its power for each successively interior layer in order to maintain an acceptable signal-to-noise ratio. Such "jumping" is performed when the DVD drive is quiescent, meaning that no workload is in process. Jumping in the manner can be performed at time T1 after the drive becomes quiescent. Time T1 can be user selectable. The digital video disc drive's laser and "servo" remain completely active. At a later time, T2, the drive can be declared idle and the laser and servo shut down. However, between times T1 and T2, the laser and tracking/focus servo are fully active yet remain in a laser-life-saving mode. In addition, the Most Frequently Used (MFU) files can be stored on the outermost layer, in order that they be read with the least laser power available.

A preferred embodiment of the present invention may include additional features such as calibrating the laser light source to only focus a laser light beam at those layers in a freshly loaded DVD disc which possess pending Input/Output (I/O) activity. Those skilled in the art will appreciate that it normally takes between 1/2 to 1 second to fully calibrate a laser (i.e., laser light source within a DVD drive) for read and write activity for one layer of DVD media, when the DVD media (i.e., DVD disk) is initially loaded into a DVD drive. For example, if a DVD having a 10 layer side is utilized with a given DVD drive, then between 5 and 10 seconds will be spent calibrating the laser to all layers of the side of DVD disk pointed towards the laser. Thus, laser life can be extended and the "time to first data" performance metric may be improved by only calibrating the laser to those layers on the DVD disc which have pending I/O activity.

Determining which layers have pending I/O activity can be determined by reading the directory associated with the DVD disk utilized or, if a duplicate copy of the directory is stored on the host PC, by reading that particular directory. By not calibrating the laser to those inactive layers (i.e., no pending workload in the queue), a significant amount of time is thus saved. Such time savings are referred to as "performance" and such parameters are very important to users. In addition, by calibrating the laser to only those layers contained in a freshly loaded DVD disc which possess pending I/O activity, the life is laser is saved by avoiding a needless calibration to the layers of the DVD disc which do not possess a pending workload queue. Should a workload later arrive for an uncalibrated layer, the laser would then be calibrated for that layer before I/O is performed.

Since a laser must be recalibrated after bringing a previously idle DVD drive up from laser and "servo" shutdown, jumping to the outermost layer saves laser power without requiring a multisecond disc "spin-up" and laser recalibration penalty, should a new workload arrive. A substantial time penalty is paid if the drive is awakened from this idle shut down mode. However, it is not necessary for a time penalty to be paid if the laser is tracking on the outermost layer of the disc and operating in the lowest laser power state, while the drive is fully active and immediately available for any new workload. The step of fully calibrating the laser to the DVD disc also involves calibration of the FES, the TES, the read power, and, the write power, if writeable media is being utilized. Because of the parameters involved, full calibration of the laser does consume a nontrivial amount of time.

Two types of DVD media are presently being utilized in DVD systems. The first type of DVD media being utilized with DVD systems is DVD-ROM (i.e., analogous to CD-ROM), which is "read only media" or "read only memory". The second type of DVD media is DVD-RAM, which is "random access media" or "random access memory". Digital video disc 12 described herein, for example, is a DVD-ROM disc. Most videos currently being sold today in DVD form are mass-produced and sold on DVD-ROM media. DVD-ROM media is typically stamped in order to mass produce copies of movies and other video materials. As explained above, capacities for digital video disc 12, a DVD-ROM disc, are in the 4.7 GB to 8.5 GB range for one and two layers per side, respectively. Such a range results in a total disc capacity of 9.4 GB to 17 GB for dual-sided DVD-ROM media. DVD-RAM can be written to as well as read from. The recording layers can be formed from magneto-optic or phase-change materials. DVD-RAM differs from DVD-ROM, in that computer users can write data to DVD-RAM discs. Computer users can read data from both DVD-ROM and DVD-RAM. Although a preferred embodiment is described in the context of DVD-ROM discs, those skilled in the art will appreciate that the present invention applies equally to DVD-RAM discs and DVD-RAM disc drives and systems.

Figure 4:
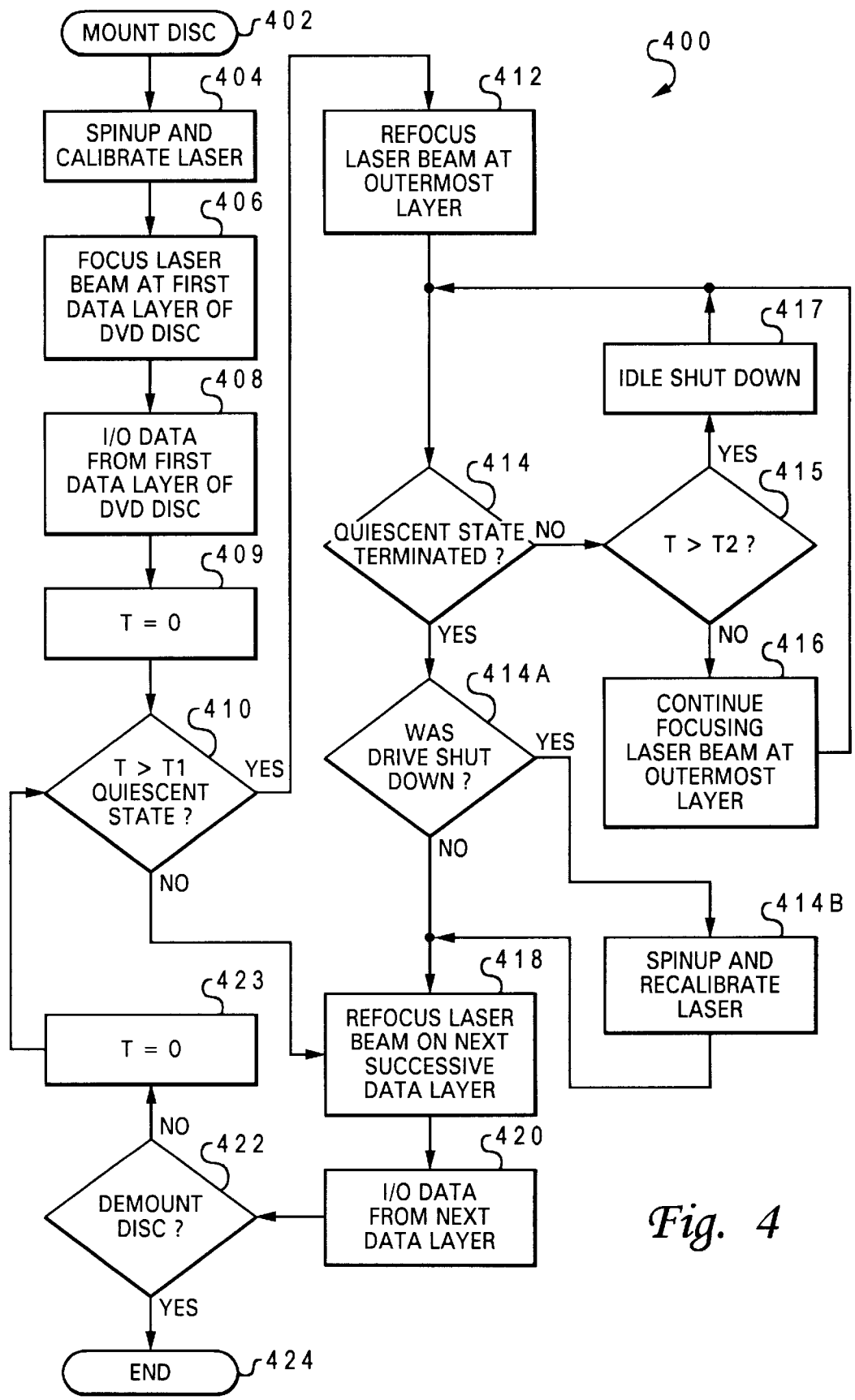
FIG. 4 depicts a flowchart of operations illustrating a method and system for conserving laser power in an optical disc drive, in accordance with a preferred embodiment of the present invention.

FIG. 4 depicts a flowchart of operations 400 illustrating a method and system for conserving laser power in an optical disc drive, in accordance with a preferred embodiment of the present invention. It can be appreciated by those skilled in the art that FIG. 4 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating an optical storage disc drive system such as digital video disc storage system 10 of FIG. 1 to FIG. 3, in processing electrical or other (e.g. mechanical, chemical) physical signals to generate other desired physical signals.

Thus, as illustrated at block 402, the process is initiated when a DVD disc is mounted in a DVD drive. Mounting of the DVD disc can occur manually by an individual user or robotically in a DVD library. As depicted at block 404, the DVD drive (e.g., digital video disc storage system 10) begins its operation by spinning up the DVD disc to is operating RPM and calibrating the laser (e.g., laser 200) to the newly mounted DVD disc (e.g., multi-layer digital video disc 12). As described thereafter at block 406, a laser beam is focused at a first data layer of the newly mounted DVD disc. Then, as depicted at block 408, I/O is performed at the first data layer of the DVD disc. Upon completion of the operation described at block 408, the quiescent time is reset to "0" as indicated by "T=0" at block 409.

Next, as illustrated at decision block 410, a test is performed to determine whether or not after the reading or writing of data from or to the data layer of the DVD disc, the DVD drive has entered a quiescent state. A determination is made as to whether or not T is greater than T1. As described earlier, time T1 is the threshold time for determining quiescence. This time is user adjustable. Time T1 is typically a non-negative integer. Those skilled in the art will appreciate that setting time T1 to one or two seconds is a reasonable quiescent-state determinator. Setting idle drive time T2 to 1 or more minutes, which is a substantially greater amount of time than T1, is appropriate for determining when drive is idle and whether or not it is time to power-down the laser and servo system. Both times T1 and T2 can be user adjustable for individual drives and adjustable at the system level for DVD libraries.

If it is determined that time T is not greater than time T1, the laser beam is simply refocused at the next succeeding layer, as indicated at block 418. However, if it is determined, as illustrated at block 410, that the DVD drive has entered a quiescent state (i.e., T>T1), then as subsequently depicted at block 412, the laser beam is automatically refocused at the outermost layer. In essence, the laser light beam generated by a laser light source within the DVD drive is refocused at the outermost data layer, if the optical storage disc drive enters a quiescent mode after the reading of data from or writing of data to that layer, such that upon refocusing the laser at the outermost data layer, the laser light source experiences a decrease in laser power, thus promoting an extension of the life of the laser light source (i.e., the DVD laser).

As thereafter indicated at block 414, a test is performed to determine if the quiescent state has terminated. If the quiescent state has not terminated, then a test is performed, as indicated at block 415 to determine whether or not the quiescent time T is greater than the idle time T2. If the answer to the operation depicted at step 415 is NO, then the process continues, as indicated at block 416, wherein the laser beam continues focusing at the outermost layer, thus conserving laser power consumption. Following completion of the operation depicted at block 416, a test is performed again, as indicated at block 414, to determine whether or not the quiescent state has terminated.

If, the answer to the operation illustrated at block 415 is YES, then the drive is declared idle and is shut down, as illustrated at block 417 (i.e., "idle shut down"). Following completion of the operation described at block 417, the operation depicted at block 414 is resumed. The idea behind these steps centers around the situation in which if only a small amount of quiescence has been attained, the laser jumps to the outermost layer of the DVD disc and remains there at a "read" power level. The "read" power level is utilized because this is the only power needed for tracking. The much higher "write" power level would result in data being overwritten. If a great amount of quiescence is attained, the drive undergoes a drive shutdown, which essentially puts the drive to "sleep."

If the answer to the operation performed at block 414 is a YES, then as depicted at block 414A, a determination is made whether or not the drive was declared idle and shut down, as indicated at blocks 415 and 417. Any previously shut down DVD drive must be restarted in order to perform any I/O activity, such as the I/O activity described at block 420. If, upon performing the operation as illustrated at block 414A, the answer is NO (i.e., the DVD drive is not "asleep" and has fully functional servo laser), then the process continues, as indicated at block 418. In other words, if idle drive was not shut down, as indicated earlier at block 417, the next data layer can be immediately sought by the laser and I/O activities performed. However, if the answer to the operation, as indicated at block 414A is YES, then as illustrated at block 414B, the disc in the drive must be spun up to its operating RPM and the laser is recalibrated. After the laser has been recalibrated, the operation depicted at block 418 is processed.

In other words, if a laser and servo shutdown occurred earlier, as indicated via the operation described at block 417, a time penalty must now be paid via the operation performed at 414B before proceeding to process the operation indicated at block 418. As described herein, an idle drive shut down saves more power than jumping to the outermost layer. However, the subsequent disc spinup and laser recalibration is a nontrivial multisecond time penalty associated with bringing up a drive from an idle drive shut down state. A penalty is not associated with additional I/O activity after jumping to the outermost layer, save a few milliseconds for a "seek" and "latency" (i.e., time for a half revolution of the disc), which would be needed regardless where the laser is focused. When the operation at depicted at 414B is executed, it is desirous to only calibrate the laser to those layers having pending workloads, in order to save laser life and perform the recalibration process as quickly as possible for the best "performance" available.

Thus, as illustrated at block 418, the laser beam is refocused at the next succeeding data layer and data is then read or written from or to the next data layer, as indicated at block 420. As described at block 422, a test is performed to determine whether to demount the DVD disc. If so, then the process simply ends, as indicated at 424. However, if not, then the process continues, as described at block 423, wherein a declaration of "T=0" demonstrates that the quiescent time has been reset to zero. Note that the step performed, as described at block 423, is analogous to the operational step illustrated at block 409. Once the quiescent time has been reset to zero, the operation performed, as indicated at block 410, is repeated.

Thus, while the invention has been particularly shown as described with reference to a preferred embodiment, it will be understood by those skilled in the art that various changes in form and detail may be made therein without departing from the spirit and scope of the invention. For example, other types of optical storage devices and optical storage disc drives other than a DVD or DVD drive may utilized in accordance with a preferred embodiment of the present invention, so as the central method and system for reducing laser consumption and extending the life of the laser device remains. It is therefore contemplated that such modifications can be made without departing from the spirit or scope of the present invention as defined in the appended claims.

What is claimed is:

1. A method in an optical storage disc drive for conserving laser power after the reading or writing of data from or to an optical storage disc via a laser light beam generated by a laser light source within said optical storage disc drive, wherein said optical storage disc contains multiple data layers therein, said method comprising the steps of:

focusing a laser light beam at an interior data layer of an optical storage disc, in order to read data stored at said interior data layer or write data to said interior data layer;

reading or writing data from or to said interior data layer, in response to focusing said laser light beam at said interior data layer; and automatically refocusing said laser light beam at an outermost data layer if said optical storage disc drive enters a quiescent mode after said reading or writing of said data, such that upon said refocusing, said laser light source experiences a decrease in laser power, thus promoting an extension of the life of said laser light source.

2. The method of claim 1 further comprising the step of:

refocusing said laser light beam at a next succeeding data layer of said optical storage disc, in response to terminating said quiescent mode.

3. The method of claim 2 wherein the step of refocusing said laser light beam at a next succeeding data layer of said optical storage disc, in response to terminating said quiescent mode, further comprises the step of:

automatically refocusing said laser light beam at a next succeeding data layer of said optical storage disc, in response to terminating said quiescent mode.

4. The method of claim 3 wherein the step of refocusing said laser light beam at a next succeeding data layer of said optical storage disc, in response to terminating said quiescent mode, further comprises the step of:

refocusing said laser light beam at a next succeeding data layer of said optical storage disc, in response to user input.

5. The method of claim 4 further comprising the step of:

storing at said outermost layer of said optical storage disc, the data most frequently used, in order that said data most frequently used be read or updated with the least laser power possible.

6. The method of claim 5 further comprising the steps of:

identifying data layers within said optical storage disc which possess pending input/output activity; and calibrating said laser light source to only said identified data layers within said optical storage disc which possess pending input/output activity, prior to beginning said pending input/output activity.

7. The method of claim 1 further comprising the step of:

storing at said outermost layer of said optical storage disc, the data most frequently used, in order that said data most frequently used be read or updated with the least laser power possible.

8. A system in an optical storage disc drive for conserving laser power after the reading or writing of data from or to an optical storage disc via a laser light beam generated by a laser light source within said optical storage disc drive, wherein said optical storage disc contains multiple data layers therein, said system comprising:

means for focusing a laser light beam at an interior data layer of an optical storage disc, in order to read data stored at said interior data layer or write data to said interior data layer;

means for reading or writing data from or to said interior data layer, in response to focusing said laser light beam at said interior data layer; and means for automatically refocusing said laser light beam at said outermost data layer if said optical storage disc drive enters a quiescent mode after said reading or writing of said data, such that upon said refocusing, said laser light source experiences a decrease in laser power, thus promoting an extension of the life of said laser light source.

9. The system of claim 8 further comprising:

means for refocusing said laser light beam at a next succeeding data layer of said optical storage disc, in response to terminating said quiescent mode.

10. The system of claim 9 wherein said means for refocusing said laser light beam at a next succeeding data layer of said optical storage disc, in response to terminating said quiescent mode, further comprises:

means for automatically refocusing said laser light beam at a next succeeding data layer of said optical storage disc, in response to terminating said quiescent mode.

11. The system of claim 10 wherein said means for refocusing said laser light beam at a next succeeding data layer of said optical storage disc, in response to terminating said quiescent mode, further comprises:

means for refocusing said laser light beam at a next succeeding data layer of said optical storage disc, in response to user input.

12. The system of claim 11 further comprising:

means for storing at said outermost layer of said optical storage disc, the data most frequently used, in order that said data most frequently used be read or updated with the least laser power possible.

13. The system of claim 12 further comprising:

means for identifying data layers within said optical storage disc which possess pending input/output activity; and means for calibrating said laser light source to only said identified data layers within said optical storage disc which possess pending input/output activity, prior to beginning said pending input/output activity.

14. The system of claim 8 further comprising:

means for storing at said outermost layer of said optical storage disc, the data most frequently used, in order that said data most frequently used be read or updated with the least laser power possible.

* * * * *